United States Patent

[11] 3,596,151

[72] Inventors Graeme W. Eldridge
Cambridge, Mass.;
Fred Chernow, Burlington, both of, Mass.

[21] Appl. No 556,653
[22] Filed June 10, 1966
[45] Patented July 27, 1971
[73] Assignee Electro-Tec Corporation

[54] CONSTANT SENSITIVITY PHOTOCONDUCTOR DETECTOR WITH A TIN OXIDE-SEMICONDUCTOR RECTIFYING JUNCTION
3 Claims, 1 Drawing Fig.

[52] U.S. Cl. .................................... 317/235 R, 250/211 J, 317/235 N
[51] Int. Cl. .................................... H01l 11/00
[50] Field of Search .................................... 250/211, 211 J; 317/235-27, 234 M

[56] References Cited

UNITED STATES PATENTS

| | | | |
|---|---|---|---|
| 3,416,044 | 12/1968 | Dreyfus et al. ................ | 317/237-27 |
| 3,049,622 | 8/1962 | Ahlstrom et al. ............. | 317/235-27 |
| 3,146,138 | 8/1964 | Shirland ...................... | 317/235-27 |
| 2,960,417 | 11/1960 | Strother ...................... | 250/211 |
| 2,965,867 | 12/1960 | Greig .......................... | 250/211 |
| 3,051,839 | 8/1962 | Carlson et al. ............... | 250/211 (J) |
| 3,170,067 | 2/1965 | Kibler .......................... | 250/211 (J) |
| 3,379,527 | 4/1968 | Corrsin et al. ............... | 250/211 X |

OTHER REFERENCES

Drozdov, V A, Kurmashev, Sh. D. and Rvachev, A L, "Method of Optically Forming a P-N Junction," Dokl Akad Nauk SSSR 162(3), pp. 530—1 (1965).

Hunter, Handbook of Semiconductor Electronics McGraw Hill, 1962, 2d Ed., pp. 8-8 to 8-10.

Ishiguro, K., Taizo Sasaki, Arai, Toshihiro, and Imai, Isamu, " Optical and Electrical Properties of Tin Oxide Films," Journal of the Physical Society of Japan, Vol. 13, No. 3, March 1958. pp. 296—304.

Bube, R. H. " Photoconductivity Speed of Response for High Intensity Excitation in CdS and Se," Journal of Applied Physics, Vol. 27 No. 10, Oct. 1956, pp. 1237—42.

RCA TN No. 15, Light-Responsive Device, Goldstein, August 1957, (Copy in 250-211 J).

*Primary Examiner*—James W. Lawrence
*Assistant Examiner*—C. M. Leedom
*Attorney*—Sughrue, Rothwell, Mion, Zinn & Macpeak

ABSTRACT: A photoconductor cell having substantially flat response to light intensities over a large portion of the visible spectrum is disclosed. The photoconductor cell comprises a sandwich construction of a heavily doped semiconductor film, a transparent electrode forming a rectifying junction with the front face of the semiconductor film, and a metal back electrode forming an injecting contact with the back face of the semiconductor film.

PATENTED JUL 27 1971 3,596,151
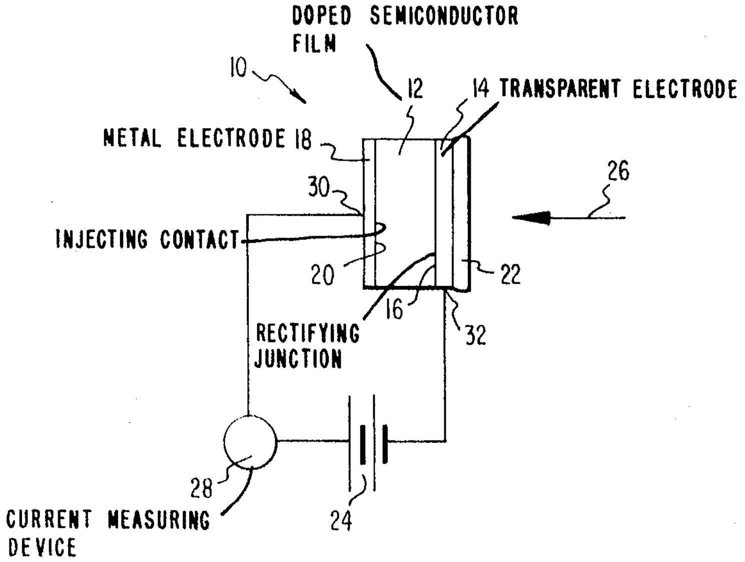
INVENTORS
GRAEME W. ELDRIDGE
FRED CHERNOW
BY
Sughrue, Rothwell, Mion, Zinn & Macpeak
ATTORNEYS

CONSTANT SENSITIVITY PHOTOCONDUCTOR DETECTOR WITH A TIN OXIDE-SEMICONDUCTOR RECTIFYING JUNCTION

This invention relates to solid state photoconductor cells.

The impedance of a photoconductor cell varies in dependence upon light intensity which is applied thereto, and thus the current through the cell is an indication of the light intensity. Prior art solid state photoconductor cells may respond accurately to certain wavelengths of light but are not satisfactory for use as general purpose light intensity detectors where the light wavelengths vary over a large portion or all of the visible spectrum.

Thermopiles do provide a flat response to light intensity over the entire visible region, but they are inherently slow and take on the order of seconds to reach equilibrum. Also, thermopiles require rather sophisticated or high-sensitivity current-measuring detectors.

The solid state photoconductor cell of the present invention overcomes the disadvantages of prior art devices in that it not only has a flat response to light intensities over large portions of or all of the visible spectrum, but has a response time in the millisecond range and requires only a simple voltage source and current measuring detector.

It is, therefore, an object of the present invention to provide a new and improved solid state photoconductor cell.

A further object of the present invention is to provide a new and improved photoconductor cell having a substantially flat response to light intensities over a large portion of the visible spectrum.

The foregoing and other objects, features and advantages of the invention will be apparent from the following more particular description of a preferred embodiment of the invention, as illustrated in the accompanying drawing, wherein the only figure is a side view of a preferred embodiment of the present invention.

Referring to the drawing, there is shown a solid state photoconductor cell 10 comprising a heavily doped semiconductor film 12, a transparent electrode 14 forming a rectifying junction 16 with the semiconductor film 12, a metal back electrode 18 forming an injecting contact 20 to the back face of semiconductor film 12, and a glass base 22 attached to the transparent electrode. A voltage source 24 in series with a current measuring device 28 is connected by means of terminals 30 and 32 across the solid state photoconductor. In operation, the cell 10 is positioned so that the light intensities to be measured, indicated by arrow 26, pass through the glass base and transparent electrode and impinge upon the semiconductive film 12 in the vicinity of the rectifying junction. The resistance of the cell varies with the light intensity and, therefore, the current measured by current measuring device 28 is dependent upon the light intensity. Current measuring device 28 may be calibrated in terms of light intensity. Furthermore, it will be obvious to those skilled in the art that additional means, such as a simple resistor, may supplement or replace the device 28 for the purpose of transmitting a light intensity dependent voltage or current to other circuitry.

The principle of operation is as follows: a semiconducting material which is sensitive to the visible light spectrum is sandwiched between two electrodes. One of these electrodes is transparent, and the second is nontransparent. A voltage is applied across these semiconductors via the electrode. The electrical resistance of this system can be divided into three series components, the first being the transparent electrode contact to the semiconductor, $R_1$, the second being the semiconductor, $R_2$; and the third being the nontransparent electrode contact to the semiconductor, $R_3$. The device is designed so that $R_2$ and $R_3$ are small compared to $R_1$. That is, the bulk resistance, $R_2$, of the semiconductor and the nontransparent electrode contact resistance, $R_3$, present negligible resistances, or impedances, to the flow of current. Under these conditions, when a voltage is applied to the device, the primary impedance to the flow of current will be the transparent electrode contact resistance, $R_1$. This contact resistance can be varied by light which passes through the front transparent electrode. The system is then used as a light-sensitive detector by applying a voltage to the two electrodes and measuring the current flowing through the device.

The semiconductor selected for the device is chosen such that its absorption edge is at the red end of the visible spectrum. In this manner light radiation in the visible spectrum passing through the transparent electrode will result in band-to-band excitation of the semiconductor and alter the electrode contact resistance. All such light will be highly absorbed in a narrow region close to the transparent electrode and will only affect the resistance of the transparent electrode contact. Such a system has a response over the entire visible spectrum which is independent to wavelength.

A semiconductor whose band-gap, or absorption edge, preferably is somewhere in the region of 7—8000 A is selected. One example of such a semiconductor is CdSe which has an absorption edge of 7300 A. This places the absorption edge of the material at the red edge of the visible spectrum with the result that all wavelengths shorter than said absorption edge wavelength are highly absorbed near the junction formed by the transparent electrode and the semiconductor film. If it is desired that the cells have a flat response only over a portion of the visible spectrum, then a semiconductive film having a lower optical absorption edge may be selected. The semiconducting film is made highly conductive by doping it with impurities. By heavily doping the film the bulk resistance is very low as compared to the resistance of the rectifying junction. Also, the resistance of the film may be further reduced by making it extremely thin. In prior art devices if the semiconductor bulk was too thin the incoming light would cause a variation in the back contact resistance. However, in the present invention, this is not a problem because the back electrode forms an injecting contact with the semiconductor film. An injecting contact has substantially zero resistance and it may be defined as a contact which develops an accumulation layer in the semiconductor in the vicinity of the electrode. Methods of forming injecting contacts to semiconductor films are known in the art. The transparent electrode is formed in a manner that produces a rectifying contact to the semiconductor thus creating the substantial resistance in the solid state cell.

An example of a particular photoconductor cell in accordance with the present invention and a method for fabrication of same is given below.

The transparent electrode, which may be tin oxide and which may be coated on a glass slide, (as for example, infrared-reflecting glass sold by the Corning Glass Co.), is prepared for a deposition of cadmium selenide. The preparation consists of first removing unwanted tin oxide, using z'nc dust and Hcl acid, as is well known in the art. The glass slide is then degreased with alcohol rinses and outgassed just prior to the cadmium selenide evaporation by baking it at temperatures above 200° C. for at least 1 hour in a vacuum system at pressures below $10^{15}$ mm. Hg.

The cadmium selenide is then prepared for evaporation by pressing 99.999 percent pure cadmium selenide powder into pellets. The pellets are outgassed at 600° C.—650° C. for approximately 15 minutes in a tantalum evaporation boat at pressures below $10^{15}$mm. Hg. A CdSe film is then deposited onto the tin oxide-coated glass slide by raising the boat temperature to between 700° C. and 725° C. at pressures below $10^{15}$mm. Hg. The tin oxide-coated glass slide is kept at a temperature of between 125° C. and 175° C. during the deposition of the CdSe. The deposition rate is approximately 1000 A per minute, and a film thickness of between 5000 A and 20,000 A is developed on the glass slide. After the film has been deposited, the resulting device is removed from the vacuum system and doped by pressing the CdSe film against a CdSe powder (with impurities of copper and chlorine, or copper and iodine) that has been packed into a tantalum boat. The device is then sealed in a Pyrex chamber which is rough-pumped to 1—10$\mu$ Hg. and baked at temperatures from 450° C. to 550° C. for 3 hours thereby forming a highly-conducting CdSe film. The nontransparent electrode which may be an indium contact is then prepared by placing the doped CdSe film in a vacuum system which is flushed repeatedly with hydrogen gas. After several flushings, the contact area for the back electrode is flow-discharged at a pressure from 50—100$\mu$ Hg. of hydrogen gas. The vacuum system is then pumped down to $10^{15}$mm. Hg. and an indium contact evaporated onto the back surface. This completes the construction of the photosensitive detector. Such a detector is operated with voltages of from 1—3 volts DC with the tin oxide contact biased negatively.

Other materials which may be used in place of CdSe are ZnTe (zinc telluride) and CdTe (cadmium telluride) which have absorption edges of 5909A and 8270A, respectively. Due to the relatively low absorption edge wavelength of ZnTe, a ZnTe detector made in accordance with the teachings of the present invention will not respond linearly in the upper wavelengths of the visible spectrum.

While the invention has been particularly shown and described with reference to a preferred embodiment thereof, it will be understood by those in the art that the foregoing and other changes in form and details may be made therein without departing from the spirit and scope of the invention.

What we claim is:

1. A photoconductor cell comprising an impurity doped semiconductor film having front and back faces, said semiconductor film being a member selected from the group consisting of cadmium selenide, cadmium telluride, and zinc telluride, a transparent tin oxide electrode in direct contact with and forming a rectifying junction with the front face of said semiconductor film and a metal electrode forming an injecting contact with the back face of said film.

2. A photoconductor cell comprising an impurity doped semiconductor film of cadmium selenide having front and back faces, a transparent tin oxide electrode in direct contact with and forming a rectifying junction with the front face of said semiconductor film, a metal indium electrode forming an injecting contact with the back face of said film, and a glass slide in contact with said tin oxide electrode.

3. A photoconductor cell as claimed in claim 1 wherein said film of CdSe has a thickness between 5,000A—10,00A.